United States Patent
Binney et al.

(10) Patent No.: US 11,156,285 B2
(45) Date of Patent: Oct. 26, 2021

(54) ASYMMETRIC GEAR TEETH

(71) Applicant: Sikorsky Aircraft Corporation, Stratford, CT (US)

(72) Inventors: David A. Binney, Milford, CT (US); Yuriy Gmirya, Woodbridge, CT (US); Joseph A. Mucci, Orange, CT (US); Jonathan Frost, Stratford, CT (US); Adam Taylor, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 54 days.

(21) Appl. No.: 16/325,371

(22) PCT Filed: Aug. 16, 2017

(86) PCT No.: PCT/US2017/047075
§ 371 (c)(1),
(2) Date: Feb. 13, 2019

(87) PCT Pub. No.: WO2018/035190
PCT Pub. Date: Feb. 22, 2018

(65) Prior Publication Data
US 2019/0195329 A1 Jun. 27, 2019

Related U.S. Application Data

(60) Provisional application No. 62/375,753, filed on Aug. 16, 2016.

(51) Int. Cl.
*F16H 55/08* (2006.01)
*B64D 35/00* (2006.01)
(Continued)

(52) U.S. Cl.
CPC ............. *F16H 55/08* (2013.01); *B64C 27/06* (2013.01); *B64C 27/12* (2013.01); *B64C 27/14* (2013.01);
(Continued)

(58) Field of Classification Search
CPC . F16H 55/08; F16H 1/28; F16H 57/08; F16H 2055/0893; F16H 55/0806;
(Continued)

(56) References Cited

U.S. PATENT DOCUMENTS 5,472,386 A 12/1995 Kish
5,605,518 A 2/1997 Kogure et al.
(Continued)

FOREIGN PATENT DOCUMENTS

DE 102012203177 A1 9/2013
EP 2402631 A1 1/2012
(Continued)

OTHER PUBLICATIONS

Extended European search report dated Feb. 25, 2020 re: Application No. EP 17842038.6, pp. 1-10, citing: F.W. Brown et al. "Analysis and Testing . . . ", US 2013/035197 A1, DE 10 2012 203177 A1, US 5 472 386 A and WO 2015/022129 A2.
(Continued)

*Primary Examiner* — Roger L Pang
(74) *Attorney, Agent, or Firm* — Michael Best & Friedrich LLP

(57) ABSTRACT

A gear train includes a first gear having teeth meshed with teeth of a second gear. Each tooth of the first gear includes a coast side and a drive side opposed to the coast side. The drive side has a pressure angle that is greater than that of the coast side. The gear train can be part of a powertrain system for a rotorcraft, and can replace a traditional gear train in a retrofit or new build. The first gear is a planet gear and the
(Continued)

second gear is a ring gear wherein the planet gear and ring gear are in a planetary gear train configuration.

16 Claims, 5 Drawing Sheets

(51) Int. Cl.
| | |
|---|---|
| *F16H 57/08* | (2006.01) |
| *B64C 27/14* | (2006.01) |
| *B64C 27/06* | (2006.01) |
| *B64C 27/12* | (2006.01) |
| *F16H 1/28* | (2006.01) |
| *F16H 57/01* | (2012.01) |
| *F16H 57/00* | (2012.01) |

(52) U.S. Cl.
CPC .............. *B64D 35/00* (2013.01); *F16H 1/28* (2013.01); *F16H 57/08* (2013.01); *F16H 55/0806* (2013.01); *F16H 2055/0893* (2013.01); *F16H 2057/0075* (2013.01); *F16H 2057/012* (2013.01)

(58) Field of Classification Search
CPC . F16H 2057/0075; B64C 27/14; B64C 27/06; B64C 27/12; B64D 35/00
USPC ............................... 475/338, 344; 29/402.08
See application file for complete search history.

(56) References Cited

U.S. PATENT DOCUMENTS

| | | | |
|---|---|---|---|
| 5,716,300 A | 2/1998 | Sammataro et al. | |
| 8,777,801 B2 | 7/2014 | Sartori et al. | |
| 2009/0277299 A1 | 11/2009 | Gmirya | |
| 2013/0035197 A1 | 2/2013 | Sartori et al. | |
| 2014/0174231 A1* | 6/2014 | Beirinckx | ............... F16H 55/08 |
| | | | 74/412 R |
| 2015/0059523 A1* | 3/2015 | Lieder | ................. F16H 55/0813 |
| | | | 74/665 F |

FOREIGN PATENT DOCUMENTS

| | | | |
|---|---|---|---|
| JP | 09032908 A | * | 2/1997 |
| WO | 2015022129 A2 | | 2/2015 |

OTHER PUBLICATIONS

F. W. Brown et al. "Analysis and Testing of Gears with Asymmetric Involute Tooth Form and Optimized Fillet Form for Potential Application in Helicopter Main Drives", Gear Technology, Jun. 1, 2011, pp. 46-55, XP055549106.
A. Kapelevich, "Geometry and Design of Involute Spur Gears with Asymmetric Teeth," Elsevier Science Ltd., Oct. 23, 1998, pp. 1-14.
PCT International Search Report; International Application No. PCT/US2017/047075; International Filing Date: Aug. 16, 2017; dated Oct. 25, 2017; pp. 1-3.
PCT ISR Written Opinion; International Application No. PCT/US2017/047075; International Filing Date: Aug. 16, 2017; dated Oct. 25, 2017; pp. 1-6.

\* cited by examiner

ASYMMETRIC GEAR TEETH

CROSS REFERENCE TO RELATED APPLICATIONS

This application is a National Stage application of PCT/US2017/047075, filed Aug. 16, 2017, which claims the benefit of U.S. Provisional Application No. 62/375,753, filed Aug. 16, 2016, both of which are incorporated by reference in their entirety herein.

BACKGROUND OF THE INVENTION

1. Field of the Invention

The present disclosure relates to gears and transmissions, and more particularly to gear teeth such as used in gears and transmissions.

2. Description of Related Art

Gear teeth such as in planetary gear systems are subjected to pitting or spalling if the pits are large. As two gears mesh, faces of the gear teeth on one gear are in direct contact with faces of the gear teeth on the other gear. Over time, the repeated contact on a gear tooth can cause pitting and other wear to alter the gear tooth. If left unchecked, the gears can begin to lose functionality, e.g., if the gear teeth wear down enough to create slop or play between the meshed gear teeth.

Wear on gear teeth can be mitigated with proper gear tooth sizing and with proper lubrication. The FAA requires passage of the endurance test for flight-worthiness certification. This requires an aircraft gear train to operate for a minimum amount of time with the transmission taken to the extremes of its operating envelope. The minimum oil pressure is used along with the maximum oil temperature and maximum torque to ensure components can continue to operate properly even in extreme situations. This creates ideal conditions for pitting failures on the lower speed gears in the transmission. If pitting occurs on a gear in the test, it constitutes a failure of the endurance test and must therefore be avoided. Providing gear teeth that can meet the certification requirements has traditionally been a design-limiting factor, limiting maximum horsepower, minimum weight, minimum form factor envelope, and the like.

Such conventional methods and systems have generally been considered satisfactory for their intended purpose. However, there is still a need in the art for improved gear teeth. The present disclosure provides a solution for this need.

SUMMARY OF THE INVENTION

A gear train includes a first gear having teeth meshed with teeth of a second gear. Each tooth of the first gear includes a coast side and a drive side opposed to the coast side. The drive side has a pressure angle that is greater than that of the coast side. The first gear is a planet gear and the second gear is a ring gear wherein the planet gear and ring gear are in a planetary gear train configuration The pressure angle of the drive side can be 36°. The coast side can have a pressure angle of 20°. Each tooth of the second gear can include a coast side and a drive side oppose to the coast side, wherein the drive side has a pressure angle that is greater than that of the coast side. The first gear can be a planet gear and the second gear can be a ring gear, with the first gear engaged radially inside the second gear.

The first gear can be one of a plurality of similar planet gears engaged radially inside the second gear. Each tooth of each of the planet gears can include a coast side and a drive side opposed to the coast side, wherein the drive side has a pressure angle that is greater than that of the coast side. Each of the planet gears can be a compound gear with first and second sets of coaxial gear teeth, wherein the first set of coaxial gear teeth is meshed with the ring gear, and wherein each of the teeth of the first set of coaxial gear teeth includes the coast side and the drive side opposed to the coast side, wherein the drive side has a pressure angle that is greater than that of the coast side. A sun gear can be included, wherein the second set of coaxial gear teeth of each planet gear is meshed with teeth of the sun gear. The teeth at the sun gear mesh can also be made asymmetrical. There can be twelve planet gears evenly spaced circumferentially around the ring gear and the sun gear.

A powertrain system for a rotorcraft includes an input module for receiving power from a powerplant system. The input module includes first stage reduction gearing. A main transmission assembly includes second stage reduction gearing mechanically coupled to the first stage reduction gearing for receiving power therefrom and a drive shaft mechanically coupled to the second stage reduction for providing power therefrom. A sun gear is mechanically coupled to the drive shaft to be driven thereby. A set of N primary planetary pinions is meshed with the sun gear, wherein N/2 of the primary planetary pinions are upper primary planetary pinions and N/2 of the primary planetary pinions are lower primary planetary pinions. The upper and lower primary planetary pinions are disposed in a staggered, biplanar relationship. A plurality of N secondary planetary pinions is included. A compound drive shaft supports each respective primary planetary pinion and a respective secondary planetary pinion. A fixed ring gear is meshed with the plurality of secondary planetary pinions. A planetary carrier assembly is disposed in rotatable combination with the compound drive shafts and operative to provide output power to a main rotor shaft of the rotorcraft. Each tooth of each of the secondary pinions includes a coast side and a drive side opposed to the coast side, wherein the drive side has a pressure angle that is greater than that of the coast side.

A method of retrofitting a rotorcraft power train includes removing a first planetary gear from a rotorcraft powertrain, wherein each tooth of the first planetary gear includes a coast side and a drive side opposed to the coast side, wherein the drive side has a pressure angle that is equal to that of coast side. The method also includes installing a replacement planetary gear into the rotorcraft powertrain, wherein each tooth of the replacement planetary gear includes a coast side and a drive side opposed to the coast side, wherein the drive side has a pressure angle that is greater than that of the coast side.

Clause 1, a gear train includes a first gear having teeth meshed with teeth of a second gear. Each tooth of the first gear includes a coast side and a drive side opposed to the coast side. The drive side has a pressure angle that is greater than that of the coast side.

Clause 2, the gear train can be as in clause 1, wherein the pressure angle of the drive side is 36°.

Clause 3, the gear train can be as in any of the preceding clauses, wherein the coast side has a pressure angle of 20°.

Clause 4, the gear train can be as in any of the preceding clauses, wherein each tooth of the second gear includes a coast side and a drive side oppose to the coast side, wherein the drive side has a pressure angle that is greater than that of the coast side.

Clause 5, the gear train can be as in any of the preceding clauses, wherein the first gear is a planet gear and the second gear is a ring gear, with the first gear engaged radially inside the second gear.

Clause 6, the gear train can be as in clause 5, wherein the first gear is one of a plurality of similar planet gears engaged radially inside the second gear, wherein each tooth of each of the planet gears includes a coast side and a drive side opposed to the coast side, wherein the drive side has a pressure angle that is greater than that of the coast side.

Clause 7, the gear train can be as in clause 6, wherein each of the planet gears is a compound gear with first and second sets of coaxial gear teeth, wherein the first set of coaxial gear teeth is meshed with the ring gear, and wherein each of the teeth of the first set of coaxial gear teeth includes the coast side and the drive side opposed to the coast side, wherein the drive side has a pressure angle that is greater than that of the coast side.

Clause 8, the gear train can be as in clause 7, further comprising a sun gear, wherein the second set of coaxial gear teeth of each planet gear is meshed with teeth of the sun gear. The teeth at the sun gear mesh can also be made asymmetrical.

Clause 9, the gear train can be as in clause 8, wherein there are twelve planet gears evenly spaced circumferentially around the ring gear and the sun gear.

Clause 10, a powertrain system for a rotorcraft includes an input module for receiving power from a powerplant system. The input module includes first stage reduction gearing. A main transmission assembly includes second stage reduction gearing mechanically coupled to the first stage reduction gearing for receiving power therefrom and a drive shaft mechanically coupled to the second stage reduction for providing power therefrom. A sun gear is mechanically coupled to the drive shaft to be driven thereby. A set of N primary planetary pinions is meshed with the sun gear, wherein N/2 of the primary planetary pinions are upper primary planetary pinions and N/2 of the primary planetary pinions are lower primary planetary pinions. The upper and lower primary planetary pinions are disposed in a staggered, biplanar relationship. A plurality of N secondary planetary pinions is included. A compound drive shaft supports each respective primary planetary pinion and a respective secondary planetary pinion. A fixed ring gear is meshed with the plurality of secondary planetary pinions. A planetary carrier assembly is disposed in rotatable combination with the compound drive shafts and operative to provide output power to a main rotor shaft of the rotorcraft. Each tooth of each of the secondary pinions includes a coast side and a drive side opposed to the coast side, wherein the drive side has a pressure angle that is greater than that of the coast side.

Clause 11, the system can be as in clause 10, wherein the pressure angle of the drive side is 36°.

Clause 12, the system can be as in any of clauses 10-11, wherein the coast side has a pressure angle of 20°.

Clause 13, the system can be as in any of clauses 10-12, wherein each tooth of the ring gear includes a coast side and a drive side oppose to the coast side, wherein the drive side has a pressure angle that is greater than that of the coast side.

Clause 14, the system can be as in any of clauses 10-13, wherein N=12.

Clause 15, the system can be as in any of claims 10-14, wherein the main transmission assembly is mounted to an airframe of a helicopter, wherein the transmission is operatively connected to be driven by an engine of the helicopter, wherein a set of main rotor blades are operatively connected to be driven by the main transmission assembly, and further comprising a tail rotor operatively connected to be driven by the engine.

Clause 16, a method of retrofitting a rotorcraft power train includes removing a first planetary gear from a rotorcraft powertrain, wherein each tooth of the first planetary gear includes a coast side and a drive side opposed to the coast side, wherein the drive side has a pressure angle that is equal to that of coast side. The method also includes installing a replacement planetary gear into the rotorcraft powertrain, wherein each tooth of the replacement planetary gear includes a coast side and a drive side opposed to the coast side, wherein the drive side has a pressure angle that is greater than that of the coast side.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
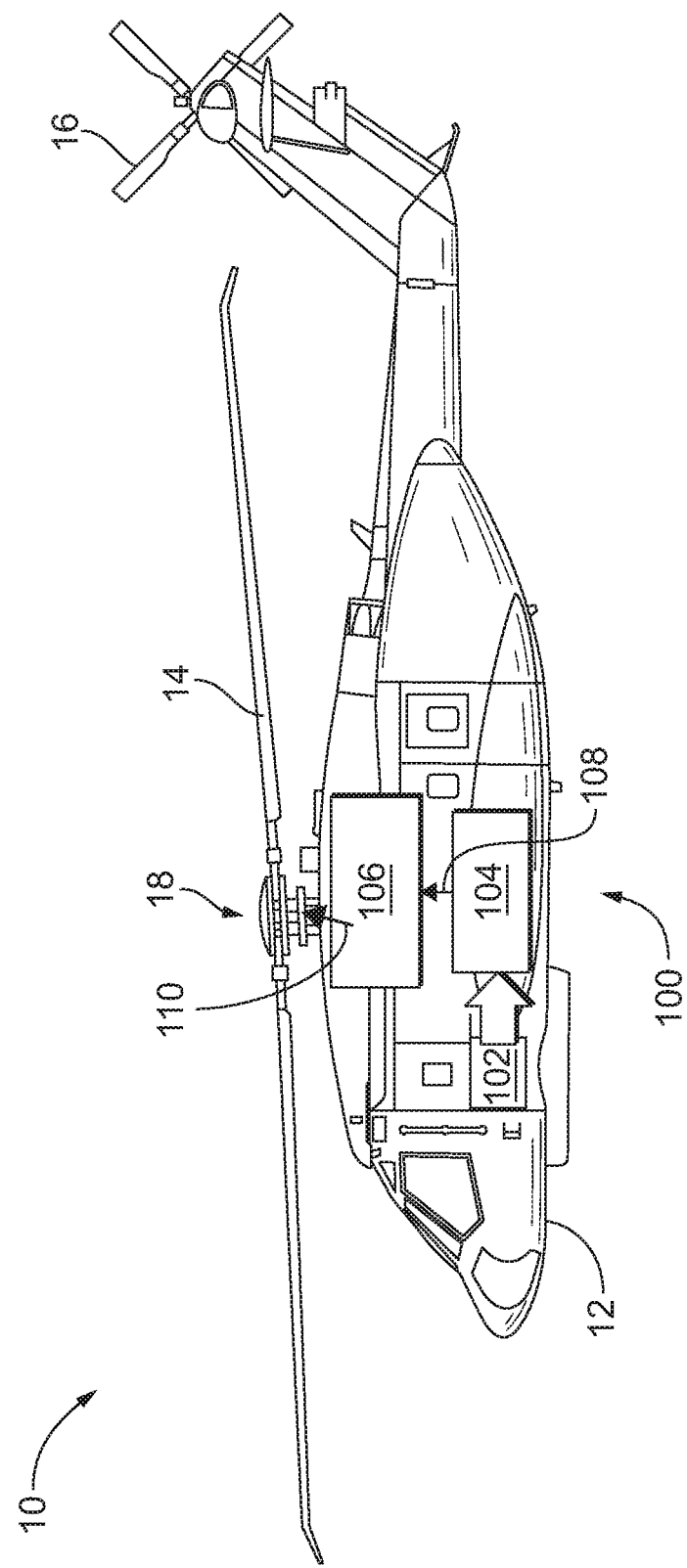
FIG. 1 is a side elevation view of an exemplary embodiment of a rotorcraft constructed in accordance with the present disclosure, schematically showing a powertrain system in accordance with the present disclosure.

Reference will now be made to the drawings wherein like reference numerals identify similar structural features or aspects of the subject disclosure. For purposes of explanation and illustration, and not limitation, a partial view of an exemplary embodiment of a powertrain system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to improve performance of gear trains, such as in rotorcraft transmissions.

Rotorcraft 10, e.g., a helicopter, includes an airframe 12, main rotor 14, and tail rotor 16. Main rotor 14, including main rotor blades, is driven about its main rotor shaft 18, which is in turn driven by a powertrain system 100. Powertrain system 100 includes an input module 104 for receiving power from a powerplant system 102, such as gas turbine engines. The input module 104 includes first stage reduction gearing. A main transmission assembly 106 includes second stage reduction gearing mechanically coupled to the first stage reduction gearing, e.g. by drive shaft 108, for receiving power therefrom and a drive shaft 110 mechanically coupled to the second stage reduction for providing power therefrom, e.g., to main rotor shaft 18.

Figure 2:
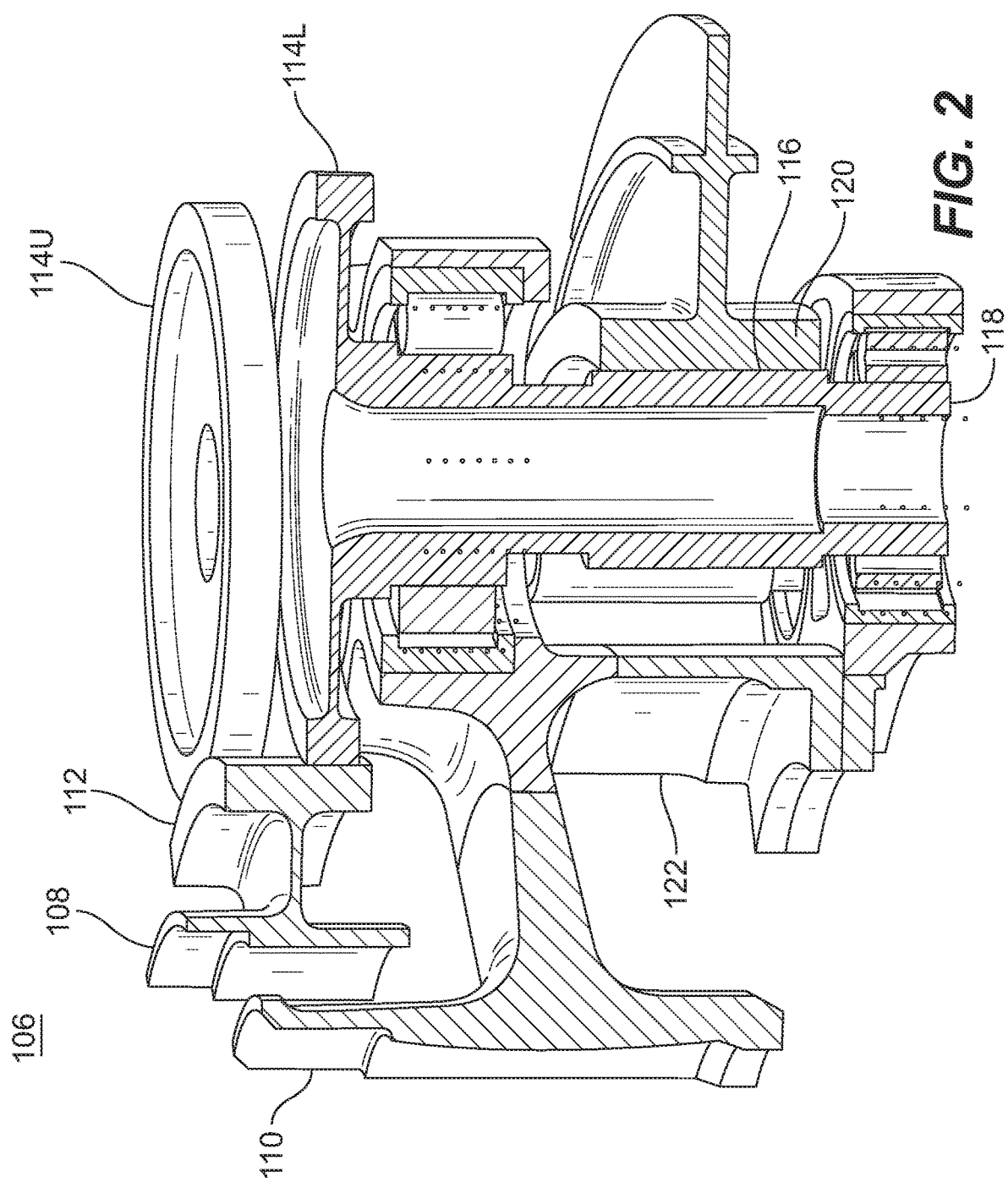
FIG. 2 is a cross-sectional perspective view of a portion of the powertrain system of FIG. 1, showing a gear train with compound planetary gears.
Figure 3:
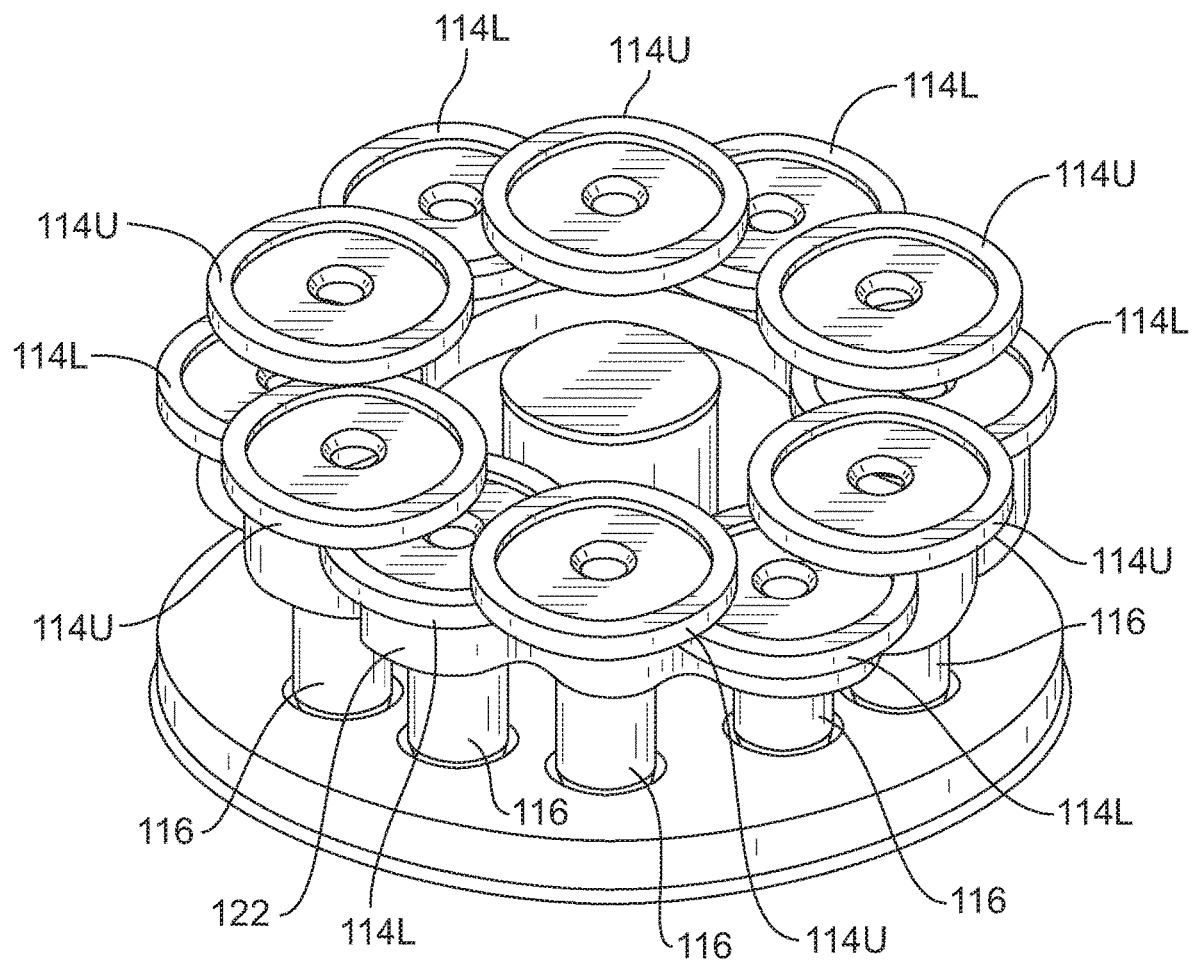
FIG. 3 is a perspective view of a portion of the gear train of FIG. 2, showing the upper and lower planetary gears.

Referring now to FIG. 2, main transmission assembly 106 is further described. The main transmission assembly 106 includes a sun gear 112 that is mechanically coupled to the drive shaft 108 to be driven thereby. A set of N primary planetary pinions 114U and 114L is meshed with the sun gear 112. N/2 of the primary planetary pinions 114U and 114L are upper primary planetary pinions 114U. N/2 of the primary planetary pinions 114U and 114L are lower primary planetary pinions 114L. The upper and lower primary planetary pinions 114U and 114L are disposed in a staggered, biplanar relationship as also shown in FIG. 3, where it shows there are a total of twelve primary planetary pinions 114U and 114L (i.e., N=12 in FIG. 3). As shown in FIG. 3, the twelve planet gears, e.g., primary planetary pinions 114U and 114L, are evenly spaced circumferentially around the ring gear 120 and the sun gear 112. With reference again to FIG. 2, a plurality of N secondary planetary pinions 116 is included. A compound drive shaft 118 supports each respective primary planetary pinion 114U or 114L and a respective secondary planetary pinion 116. A fixed ring gear 120 is meshed with the plurality of secondary planetary pinions 116, with the secondary planetary pinions 116 engaged radially inside the ring gear 120. A planetary carrier assembly 122, also shown in FIG. 3, is disposed in rotatable combination with the compound drive shafts 118 and operative to provide output power to the main rotor shaft 18 of the rotorcraft 10, shown in FIG. 1, by way of drive shaft 110.

Figure 4:
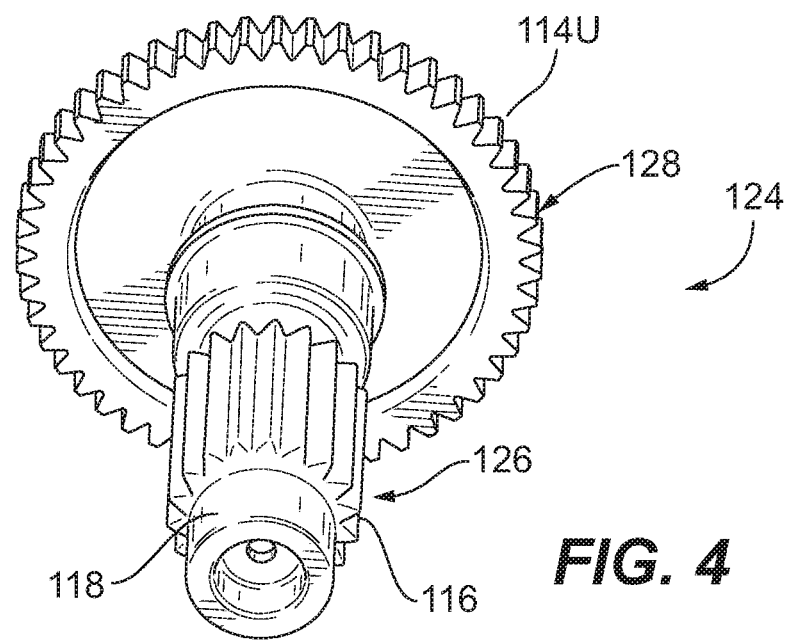
FIG. 4 is a perspective view of one of the compound planetary gears of FIG. 3, showing the first and second sets of gear teeth.

With reference to FIG. 4, each of the planet gears, e.g., each respective assembly of a primary planetary pinion 114U or 114L, a secondary planetary pinion 116, and compound drive shaft 118 can be a compound gear 124. Compound gear 124 therefore includes first and second sets of coaxial gear teeth 126 and 128, respectively. The first 126 set of coaxial gear teeth is meshed with the ring gear 120, and the second set of coaxial gear teeth is meshed with the sun gear 112 of FIG. 2.

Figure 5:
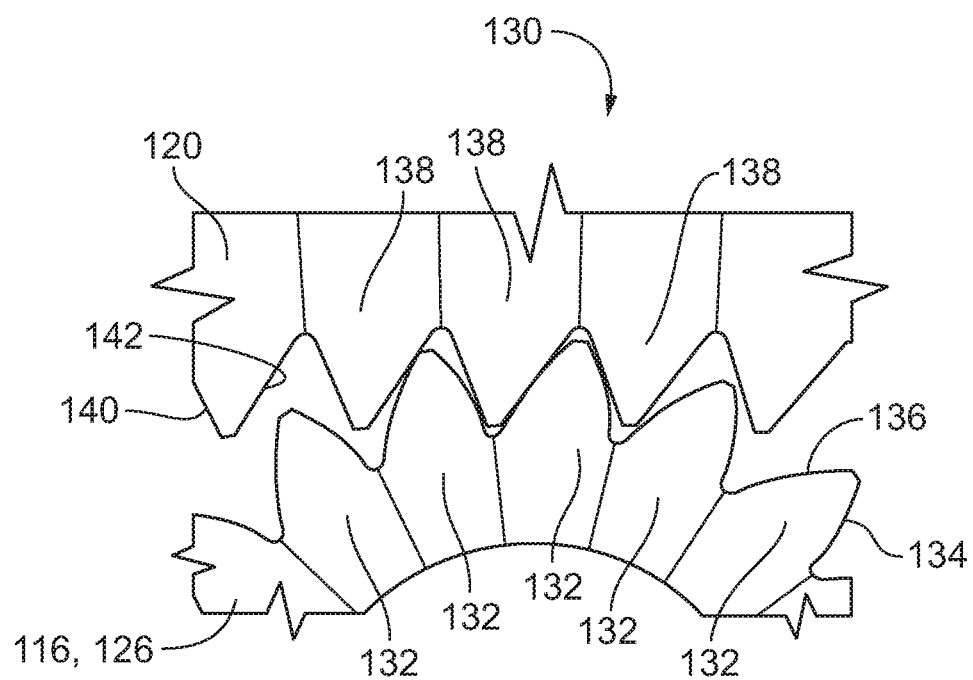
FIG. 5 is a schematic plan view of a portion of the gear train of FIG. 2, showing the meshing of gear teeth of the ring gear with the lower set of gear teeth of one of the compound planetary gears.

With reference now to FIG. 5, the ring gear 120 and secondary planetary pinion 116 form part of a gear train 130 that includes a first gear, e.g., secondary planetary pinion 116, having teeth meshed with teeth of a second gear, e.g., ring gear 120. Each tooth 132 of secondary planetary pinion 116 includes a coast side 134 and a drive side 136 opposed to the coast side 134. The drive side 136 has a pressure angle that is greater than that of the coast side 134, making each gear tooth 132 asymmetrical. The teeth at the sun gear mesh can also be made asymmetrical like teeth 132.

Figure 6:
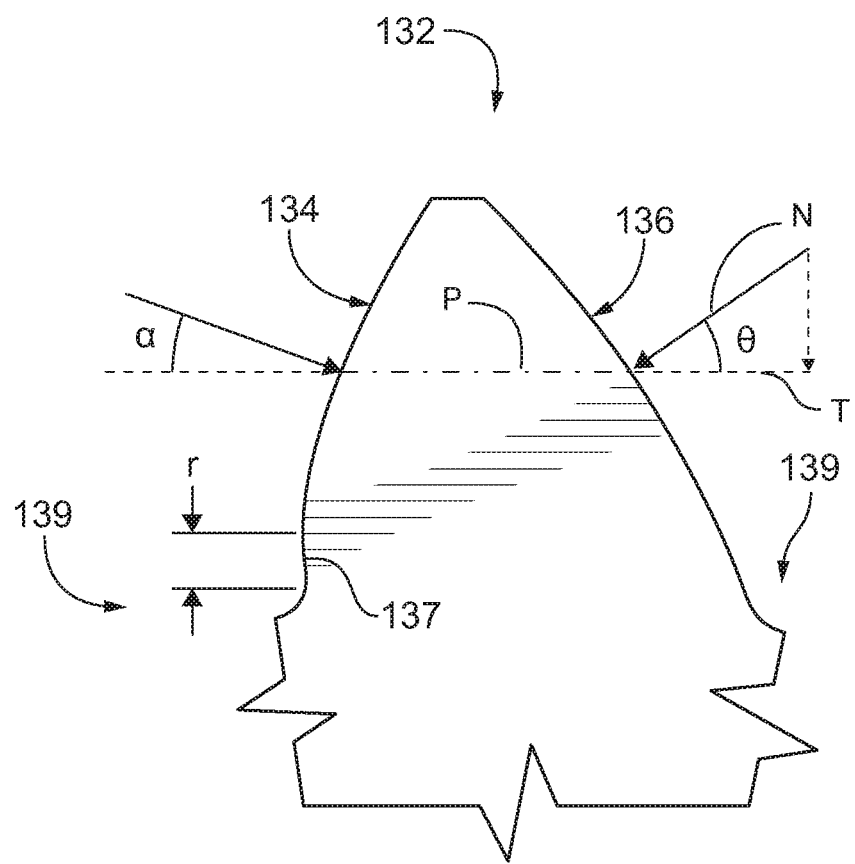
FIG. 6 is a schematic plan view of one of the gear teeth of the planetary gear of FIG. 5, showing the pressure angle of the drive side being greater than the pressure angle of the coast side.

With reference now to FIG. 6, a single one of the gear teeth 132 is shown. The pressure angle of the drive side 136 is labeled θ. The pressure angle is an angle formed by a line T tangent to a pitch circle P, and the line normal N to the tooth profile at the pitch circle P. The coast side 134 has a pressure angle labeled α, which is less than the pressure angle θ (i.e., θ<α). While not limited thereto, and in the example, the pressure angle θ is equal to 36°, and the pressure angle α is equal to 20° for a ratio of θ/α Of 1.8. However those skilled in the art will readily appreciate that any other suitable angle θ or α can be used for a given application without departing from the scope of this disclosure. Those skilled in the art will also appreciate that there is a range of ratios θ/α that can be used as needed for a given application without departing from the scope of this disclosure. Generally there will be a lower limit on how small the coast side pressure angle α can be and a corresponding upper limit on how high the drive side pressure angle θ can be. Combinations within those limits are possible. The coast side lower limit is typically dictated geometrically by the condition that the tip of the mating gear cannot contact the root fillet of the coast side. The mating tip comes closer to the root fillet as the coast side pressure angle gets smaller. The drive side upper limit is typically influenced by a number of factors including the need to maintain a minimum contact ratio (typically 1.2 or 1.3), the need to limit bearing reaction forces, the need to maintain a minimum topland thickness, and considerations of the carburization depth.

There is a radius portion 137 that joins the roots 139 of the two sides of the gear teeth 132, the length of which is identified as radius r in FIG. 6. Traditionally, a circular arc of a constant radius would be used instead of a radius portion. However, gear teeth 132 include two circular arcs of different radii, e.g., defining coast side 134 and drive side 136, and a straight line segment, e.g., defining radius portion 137. This allows a larger drive side pressure angle θ, and larger root radius on the drive side 136, which benefits strength.

Referring again to FIG. 5, to properly mesh with teeth 132 of the secondary planetary pinion 116, the gear teeth 138 of ring gear 120 are also asymmetrical. Each tooth 138 of the ring gear 120 includes a coast side 140 and a drive side 142 oppose to the coast side 140, wherein the drive side 142 has a pressure angle that is greater than that of the coast side 142, similar to that shown in FIG. 6. In order to drive the ring gear 120 relative to the secondary planetary pinion 116, the drive side 136 contacts the drive side 142.

Figure 7:
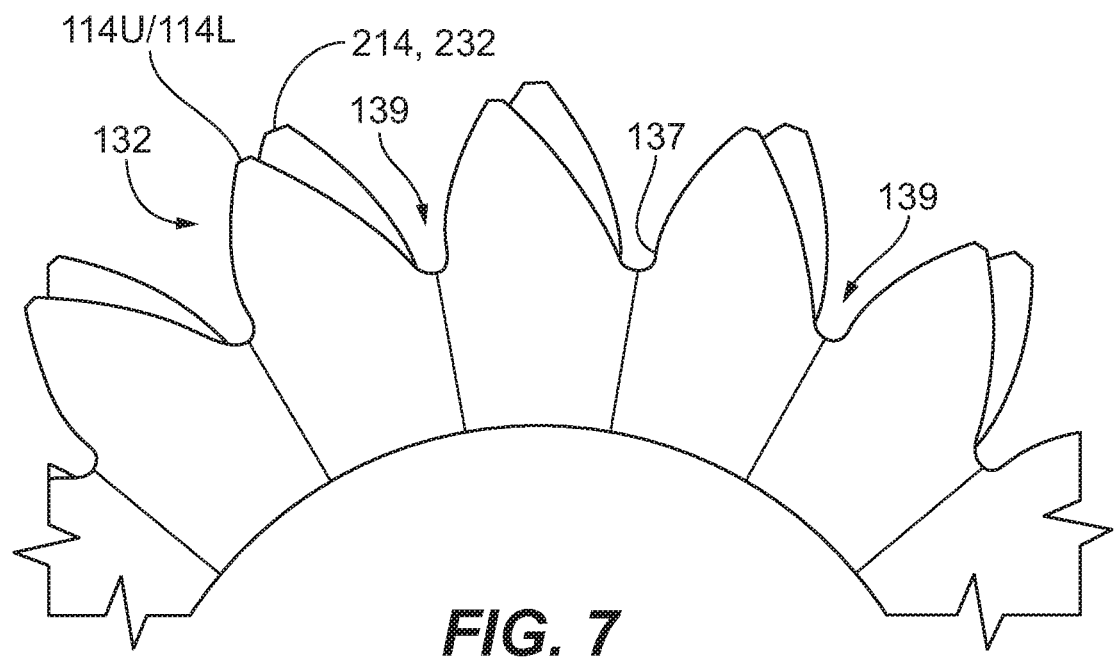
FIG. 7 is a schematic plan view of the lower set of gear teeth of the planetary gear of FIG. 5, showing the gear teeth of the planetary gear of FIG. 5 overlying the symmetrical gear teeth of a traditional planetary gear for comparison.

With reference now to FIG. 7, a method of retrofitting a rotorcraft powertrain, e.g. powertrain system 100 of rotorcraft 10, includes removing a first planetary gear, e.g., the primary planetary pinion 214 shown in FIG. 7, from the rotorcraft powertrain, wherein each tooth 232 of the first planetary gear includes a coast side and a drive side opposed to the coast side, wherein the drive side has a pressure angle that is equal to that of coast side. The pressure angles of the coast and driver side being equal makes the teeth 232 of the first planetary gear 214 symmetrical, as in a traditional planetary gear. The method also includes installing a replacement planetary gear, e.g., primary planetary pinion 114, into the rotorcraft powertrain, wherein each tooth of the replacement planetary gear includes a coast side, e.g. coast side 134, and a drive side, e.g., drive side 136, opposed to the coast side, wherein the drive side has a pressure angle θ that is greater than that (α) of the coast side, e.g. as shown in FIG. 6. In FIG. 7, the first planetary gear 214 is shown overlaid by the replacement primary planetary pinion 114U or 114L for comparison. Those skilled in the art will readily appreciate that gear trains with asymmetrical gear teeth as described herein can be part of a retrofit as described in conjunction with FIG. 7, or can be part of an original build without departing from the scope of this disclosure. The gear train 130 shown in FIG. 5 can be made to fit in the same design envelope as traditional gear trains, e.g., in rotorcraft transmissions.

With the higher pressure angle on the drive side, the drive side of the gear teeth, e.g., gear tooth 132 in FIG. 6, is flatter than in the traditional symmetrical gear tooth, as can be seen by the comparison in FIG. 7. This flatter drive side surface reduced contact stress, increases oil film thickness between meshed gear teeth, and improves the endurance of the gear train, e.g., by reducing heat generation and reducing the risk of pitting. This opens up the possibility of operating a rotorcraft transmission at a higher power level, for example.

While shown and described in the exemplary context where the drive side has the higher pressure angle, it is also contemplated that there is another approach where the lower pressure angle is on the drive side and the higher pressure angle on the coast side without departing from the scope of this disclosure.

The methods and systems of the present disclosure, as described above and shown in the drawings, provide for gear trains with superior properties including the potential for better useable life and application of higher horse power, e.g., in rotorcraft transmissions. While shown in relation to a planetary gear used in a single rotor aircraft, those skilled in the art will readily appreciate that changes and/or modifications may be made thereto without departing from the scope of the subject disclosure, including through use in other planetary and non-planetary gear arrangements, and use in coaxial rotorcraft and/or fixed wing engine transmissions. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gear train comprising:
    a first gear having teeth meshed with teeth of a second gear, wherein each tooth of the first gear includes a coast side and a drive side opposed to the coast side, wherein the drive side has a pressure angle that is greater than that of the coast side, and
    further wherein the first gear is a planet gear and the second gear is a ring gear wherein the planet gear and ring gear are in a planetary gear train configuration such that the first gear is engaged radially inside the second gear and at a location where the teeth mesh is radially between the first and second gears;
    wherein the pressure angle is an angle defined by a first line tangent to a pitch circle, and a second line normal to a tooth profile at the pitch circle;
    wherein a ratio of the drive side pressure angle to the coast side pressure angle is 1.8.

2. The gear train as recited in claim 1, wherein the pressure angle of the drive side is 36°.

3. The gear train as recited in claim 1, wherein the coast side has a pressure angle of 20°.

4. The gear train as recited in claim 1, wherein each tooth of the second gear includes a coast side and a drive side oppose to the coast side, wherein the drive side has a pressure angle that is greater than that of the coast side.

5. The gear train as recited in claim 1, a rotation axis of the first gear is parallel to a rotation axis of the second gear.

6. The gear train as recited in claim 1, wherein the first gear is one of a plurality of similar planet gears engaged radially inside the second gear.

7. The gear train as recited in claim 6, wherein each of the planet gears is a compound gear with first and second sets of coaxial gear teeth, wherein the first set of coaxial gear teeth is meshed with the ring gear.

8. The gear train as recited in claim 7, further comprising a sun gear, wherein the second set of coaxial gear teeth of each planet gear is meshed with teeth of the sun gear.

9. The gear train as recited in claim 8, wherein there are twelve planet gears evenly spaced circumferentially around the ring gear and the sun gear.

10. A powertrain system for a rotorcraft comprising:
    an input module for receiving power from a powerplant system, the input module including first stage reduction gearing;
    a main transmission assembly including second stage reduction gearing mechanically coupled to the first stage reduction gearing for receiving power therefrom and a drive shaft mechanically coupled to the second stage reduction for providing power therefrom;
    a sun gear mechanically coupled to the drive shaft to be driven thereby;
    a set of N primary planetary pinions meshed with the sun gear, wherein N/2 of the primary planetary pinions are upper primary planetary pinions and N/2 of the primary planetary pinions are lower primary planetary pinions, wherein the upper and lower primary planetary pinions are disposed in a staggered, biplanar relationship;
    a plurality of N secondary planetary pinions;
    a compound drive shaft supporting each respective primary planetary pinion and a respective secondary planetary pinion;
    a fixed ring gear meshed with the plurality of secondary planetary pinions wherein the secondary planetary pinions are engaged radially inward of the ring gear; and
    a planetary carrier assembly disposed in rotatable combination with the compound drive shafts and operative to provide output power to a main rotor shaft of the rotorcraft,
    wherein each tooth of each of the secondary pinions includes a coast side and a drive side opposed to the coast side, wherein the drive side has a pressure angle that is greater than that of the coast side;
    wherein the pressure angle is an angle defined by a first line tangent to a pitch circle, and a second line normal to a tooth profile at the pitch circle;
    wherein a ratio of the drive side pressure angle to the coast side pressure angle is 1.8.

11. The system as recited in claim 10, wherein the pressure angle of the drive side is 36°.

12. The system as recited in claim 10, wherein the coast side has a pressure angle of 20°.

13. The system as recited in claim 10, wherein each tooth of the ring gear includes a coast side and a drive side oppose to the coast side, wherein the drive side has a pressure angle that is greater than that of the coast side.

14. The system as recited in claim 10, wherein N=12.

15. The system as recited in claim 10, wherein the main transmission assembly is mounted to an airframe of a helicopter, wherein the transmission is operatively connected to be driven by an engine of the helicopter, wherein a set of main rotor blades are operatively connected to be driven by the main transmission assembly, and further comprising a tail rotor operatively connected to be driven by the engine.

16. A method of retrofitting a rotorcraft powertrain, the powertrain including a first planetary gear engaged radially inside a second internal gear, the method comprising:

removing the first planetary gear from a rotorcraft powertrain, wherein each tooth of the first planetary gear includes a coast side and a drive side opposed to the coast side, wherein the drive side has a pressure angle that is equal to that of the coast side; and installing a replacement planetary gear into the rotorcraft powertrain, wherein each tooth of the replacement planetary gear includes a coast side and a drive side opposed to the coast side, wherein the drive side has a pressure angle that is greater than that of the coast side;

wherein the pressure angles of the first planetary gear and the replacement planetary gear are defined by a first line tangent to a pitch circle, and a second line normal to a tooth profile at the pitch circle;

wherein a ratio of the drive side pressure angle to the coast side pressure angle of the replacement planetary gear is 1.8.

* * * * *